United States Patent [19]

Kimbrough et al.

[11] Patent Number: 5,672,918

[45] Date of Patent: Sep. 30, 1997

[54] SYSTEM LEVEL LATCHUP MITIGATION FOR SINGLE EVENT AND TRANSIENT RADIATION EFFECTS ON ELECTRONICS

[75] Inventors: Joseph Robert Kimbrough, Pleasanton; Nicholas John Colella, Livermore, both of Calif.

[73] Assignee: The United States of America as represented by the United States Department of Energy, Washington, D.C.

[21] Appl. No.: 291,086

[22] Filed: Aug. 18, 1994

[51] Int. Cl.$^6$ ............................ H01H 35/00; B01D 59/44
[52] U.S. Cl. ........................ 307/126; 307/131; 307/125; 361/57; 250/389; 340/600
[58] Field of Search ............................ 307/112, 113, 307/115, 125, 126, 131; 361/54, 55, 56, 57; 257/428, 431, 467, 472; 363/50; 250/389; 340/600

[56] References Cited

U.S. PATENT DOCUMENTS

| | | | |
|---|---|---|---|
| 4,191,992 | 3/1980 | Johannessen | 363/50 |
| 4,687,622 | 8/1987 | Longden | 376/254 |
| 4,695,937 | 9/1987 | Verity | 363/25 |
| 4,736,116 | 4/1988 | Pavlak, Jr. et al. | 307/41 |
| 5,010,321 | 4/1991 | Larner et al. | 340/600 |
| 5,383,086 | 1/1995 | Wietelmann et al. | 361/152 |
| 5,391,931 | 2/1995 | Larner | 307/117 |

*Primary Examiner*—William M. Shoop, Jr.
*Assistant Examiner*—Jonathan S. Kaplan
*Attorney, Agent, or Firm*—Robert M. Padilla; William C. Daubenspeck; William R. Moser

[57] ABSTRACT

A "blink" technique, analogous to a person blinking at a flash of bright light, is provided for mitigating the effects of single event current latchup and prompt pulse destructive radiation on a micro-electronic circuit. The system includes event detection circuitry, power dump logic circuitry, and energy limiting measures with autonomous recovery. The event detection circuitry includes ionizing radiation pulse detection means for detecting a pulse of ionizing radiation and for providing at an output terminal thereof a detection signal indicative of the detection of a pulse of ionizing radiation. The current sensing circuitry is coupled to the power bus for determining an occurrence of excess current through the power bus caused by ionizing radiation or by ion-induced destructive latchup of a semiconductor device. The power dump circuitry includes power dump logic circuitry having a first input terminal connected to the output terminal of the ionizing radiation pulse detection circuitry and having a second input terminal connected to the output terminal of the current sensing circuitry. The power dump logic circuitry provides an output signal to the input terminal of the circuitry for opening the power bus and the circuitry for shorting the power bus to a ground potential to remove power from the power bus. The energy limiting circuitry with autonomous recovery includes circuitry for opening the power bus and circuitry for shorting the power bus to a ground potential. The circuitry for opening the power bus and circuitry for shorting the power bus to a ground potential includes a series FET and a shunt FET. The invention provides for self-contained sensing for latchup, first removal of power to protect latched components, and autonomous recovery to enable transparent operation of other system elements.

20 Claims, 6 Drawing Sheets

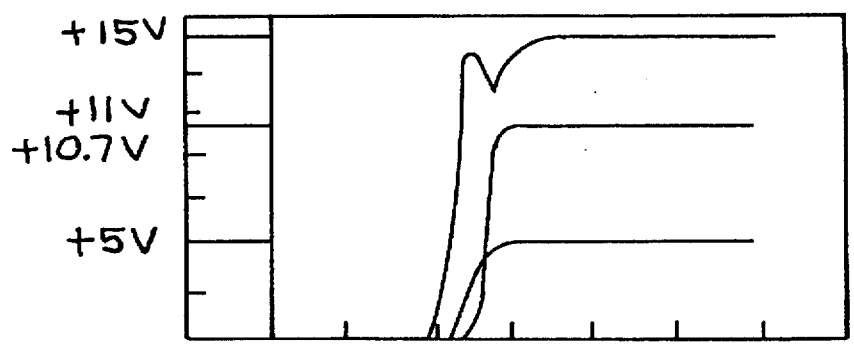
FIG. 7F
FIG. 7G
FIG. 7H
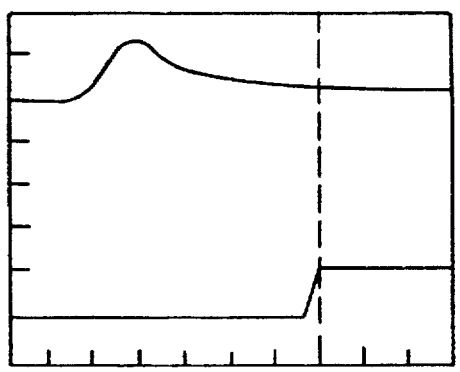

SYSTEM LEVEL LATCHUP MITIGATION FOR SINGLE EVENT AND TRANSIENT RADIATION EFFECTS ON ELECTRONICS

GOVERNMENT RIGHTS

The United States Government has rights in this invention pursuant to Contract No. W-7405-ENG-48 between the United States Department of Energy and the University of California.

BACKGROUND OF THE INVENTION

1. Field of the Invention

This invention relates to techniques for protecting microelectronic circuits against current latchup and burnout due to single event latchup (SEL) and transient radiation effects on electronics (TREE).

2. Prior Art

Electronic devices designed for spacecraft should be fault-tolerant and should be able to operate without ground-control intervention through extreme conditions of a space radiation environment. If designed for military use, electronic devices must be able to survive and function in a nuclear radiation effects environment. The requirements for reliable performance in radiation environments are met by the use of radiation-hardened electronic parts and by the use of circumvention circuits for protection against a radiation pulse.

Radiation hardened parts are expensive and their performance lags significantly behind the performance of commercial devices. Using commercial devices can provide significant increases in the computational, imaging, and mission performance of a satellite without requiring increases in cost, mass, and power.

Circumvention is a technique whereby an electronic system is switched to a temporary state in which all of the system I/O ports are clamped to a ground potential as soon as a radiation pulse is detected. When the radiation pulse is removed, the system reverts to its initial state prior to the pulse. Circumvention includes detection of the pulse, protection of the system, and recovery techniques to restore the system to its nominal or a known state of operation.

System-level latchup mitigation and fault-tolerant computing technologies address problems caused by single-event-upsets (SEU) and destructive single-event-phenomena (SEP), which are caused by solar protons and cosmic ray nuclei, henceforth called "ions", or by prompt ionizing radiation pulses generated by a nuclear weapon detonation.

Destructive single-event phenomena (SEP) caused by ions include single-event latchup (SEL), single-event burnout (SEB), and single-event gate rupture (SEGR). An energetic charged ion creates a high-density current path in a micro-electronic device, which results in rapid overheating and may cause local melting in the metallization and dielectric layers of the device.

In a CMOS device, an ion creates a parasitic 4-layer p-n-p-n silicon-controlled-rectifier (SCR), which results in a SEL. After only a fraction of a milli-second, the high density current in the SCR can destroy the device.

A SEB occurring in a n-channel MOSFET device depends on the operating voltages of the device. The ionization path created by an ion can have a current density sufficient to turn on a parasitic npn bipolar transistor which then goes into a current avalanche mode. Device burnout occurs within tens to hundreds of microseconds, depending upon the drain-to-source voltage and the current density.

SEGR is caused by an ion creating a high conductivity path through the gate dielectric and rupturing of the gate dielectric. Sufficient energy must be stored in the electric field of the gate to melt the dielectric and the metallization layers. Power MOSFETs and EEPROMs are particularly susceptible to SEGR due to the presence of high electric fields across the insulators of these devices. A high electric field is present in EEPROMs only during an erase or a write operation.

The need has arisen for a cost-effective technique to protect circuit modules of microelectronic devices in spacecraft or in high-altitude aircraft against single-event-upsets (SEU) and destructive single-event-phenomena (SEP), which are caused by cosmic ray particles or by prompt ionization pulses generated by a nuclear weapon detonation.

SUMMARY OF THE INVENTION

It is therefore an object of the invention to provide techniques for system level latchup mitigation and for fault-tolerant computing technologies which address single-event-upsets (SEU) and destructive single-event-phenomena (SEP) due to cosmic ray particles or to prompt ionization pulses generated by a weapon.

In accordance with this and other objects of the invention, a system is provided for mitigating the effects of destructive radiation on a microelectronic circuit. The system includes a power bus providing power to an electronic circuit or to devices which are particularly susceptible. An ionizing radiation pulse detection means is provided for detecting a pulse of ionizing radiation and for providing at an output terminal thereof a detection signal indicative of the detection of a pulse of ionizing radiation. The ionizing radiation pulse detection means also includes a test input terminal which is activated to also produce a signal at the output terminal. A current sensing means is coupled to the power bus for determining an occurrence of excess current through the power bus caused by ionizing radiation, SEU, or SEP. The current sensing means has an output terminal at which is provided a control signal indicative of the occurrence of excess current through the power bus caused by a latchup condition in a microelectronic circuit connected to the power bus. Power dump logic means has a first input terminal connected to the output terminal of the ionizing radiation pulse detection means. The power dump logic means also has a second input terminal connected to the output terminal of the current sensing means. The power dump logic means provides an output signal to the input terminal of the means for opening the power bus and, the means for shorting the power bus to a ground potential to remove power from the power bus. Power dump means, having an input terminal and an output terminal, are provided for opening the power bus and for shorting the power bus to a ground potential to remove power from the power bus.

The system includes a DC/DC converter for providing power to the power bus and the DC/DC converter includes an inhibit input terminal. The current sensing means includes a resistor in series with the power bus across which is developed a sensing voltage and includes a comparator circuit for comparing the sensing voltage with a reference voltage. The means for opening the power bus and means for shorting the power bus to a ground potential includes a series FET and a shunt FET. The system includes autonomous recovery means for restoration of power upon time out of the radiation pulse detector.

A system is provided for mitigating the effects of single event and prompt pulse destructive radiation on a microelectronic circuit. The system includes event detection means, power dump logic means, and energy limiting measures with autonomous recovery. The event detection means includes ionizing radiation pulse detection means for detecting a pulse of ionizing radiation and for providing at an output terminal thereof a detection signal indicative of the detection of a pulse of ionizing radiation. The current sensing means is coupled to the power bus for determining an occurrence of excess current through the power bus caused by ionizing radiation, SEU, or SEP. The power dump means includes power dump logic means having a first input terminal connected to the output terminal of the ionizing radiation pulse detection means and having a second input terminal connected to the output terminal of the current sensing means. The power dump logic means provides an output signal to the input terminal of the means for opening the power bus and the means for shorting the power bus to a ground potential to remove power from the power bus. The energy limiting means with autonomous recovery includes means for opening the power bus and means for shorting the power bus to a ground potential. The means for opening the power bus and means for shorting the power bus to a ground potential includes a series FET and a shunt FET.

The invention provides a method for mitigating the effects of destructive radiation on a micro-electronic circuit, comprising the steps of: providing an output voltage on a power bus; detecting a pulse of ionizing radiation; and providing a detection signal indicative of the detection of a pulse of ionizing radiation and providing an ionizing-radiation alarm signal indicative thereof; determining an occurrence of excess current through said power bus and providing an excess-current alarm signal indicative thereof; and opening the power bus and shorting the power bus to a ground potential to quickly remove power from the power bus in response to an ionizing-radiation alarm signal or to an excess-current alarm signal.

The step of providing an output voltage on a power bus includes providing a DC/DC converter, or power supply, for providing power to the power bus. The method includes the step of providing other output voltages from the output voltage on the power bus. The step of determining an occurrence of excess current through said power bus includes sensing a voltage across a resistor in series with the power bus and comparing the sensing voltage with a reference voltage. The step of opening the power bus and shorting the power bus to a ground potential to quickly remove power from the power bus in response to an ionizing-radiation alarm signal or to an excess-current alarm signal includes activating a series FET and a shunt FET.

A system according to the invention mitigates latchup current effects at the system level rather than the component part level and removes the restriction that all parts must be latchup immune. The "blink" approach addresses current latchup at a system, subsystem or package level of integration, rather than at a component or device level. Detection either of an external high flux event or of excess internal current flow causes the system according to the invention to "blink". Within microseconds power is disconnected from the system and the stored energy of the system is dumped to ground before damage to the semiconductor devices can occur. This system level mitigation is analogous to a person blinking at a bright flash of light.

The invention provides for self-contained sensing for latchup, fast removal of power to protect latched components, and autonomous recovery to enable transparent operation of other system elements. The invention detects a latchup and removes, or dumps, power in less than a few microseconds from all susceptible devices before damage can occur.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7F is a plot of the positive output voltages, showing fill-time and rise-time.

FIG. 7G shows an expanded view of the strobe light excitation signal used to cause latchup and FIG. 7H shows the comparator output signal for a system according to the invention

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

The invention uses a so called "blink" approach to address current latchup at the system, subsystem, or package level of integration. Detection of either an external high flux event or of an internal excess current flow causes the system to "blink", analogous to a person blinking at a bright flash of light. Within microseconds power is disconnected and the stored energy dumped to ground before damage to semiconductor devices can occur. A system according to the invention provides self-contained sensing for latchup of a microelectronic circuit, fast removal of power to protect latched circuits, and autonomous recovery. The system detects a latchup condition and removes power (called power dump) in less than 2 microseconds from all susceptible devices before damage can occur. This specification describes circuitry and the results of heavy ion and flash x-ray (FXR) tests which demonstrate the effectiveness of this inventive approach in a high performance star tracker camera system designed by Lawrence Livermore National Laboratory (LLNL).

Figure 1:
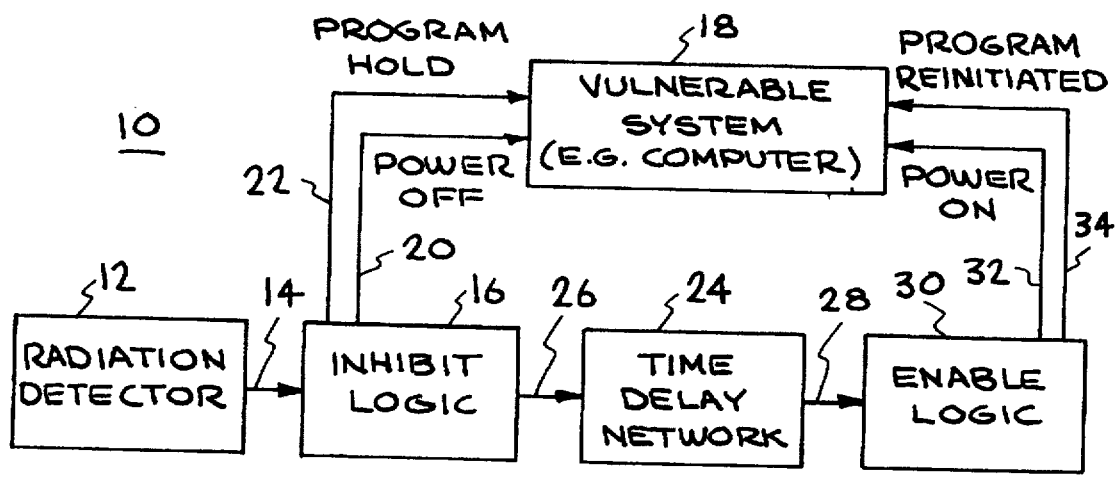
FIG. 1 is a functional block diagram of a prior art system for circumvention of pulsed radiation effects.

FIG. 1 is a functional block diagram of an example of a prior art system 10 for circumvention of pulsed radiation effects. A radiation detector 12 senses the presence of a radiation pulse and emits a detection signal on signal line 14 which has a duration of 0.1–10 milliseconds and which triggers an inhibit logic circuit 16. For a vulnerable system, such as a computer system 18, the inhibit logic sends a power-off signal on a signal line 20 and a program-hold signal on a signal line 22. A time-delay circuit 24 receives a start signal on a signal line 26 and, after a suitable delay, provides a trigger signal on a signal line 28 to an enable logic circuit 30. The enable logic circuit 30 provides a power-on signal on a signal line 32 and a program reinitiate signal on a signal line 34 to the computer system 18. The output signals of the enable logic circuit 30 cause the system 18 to revert to its state prior to the radiation pulse and to continue its operation.

Figure 2:
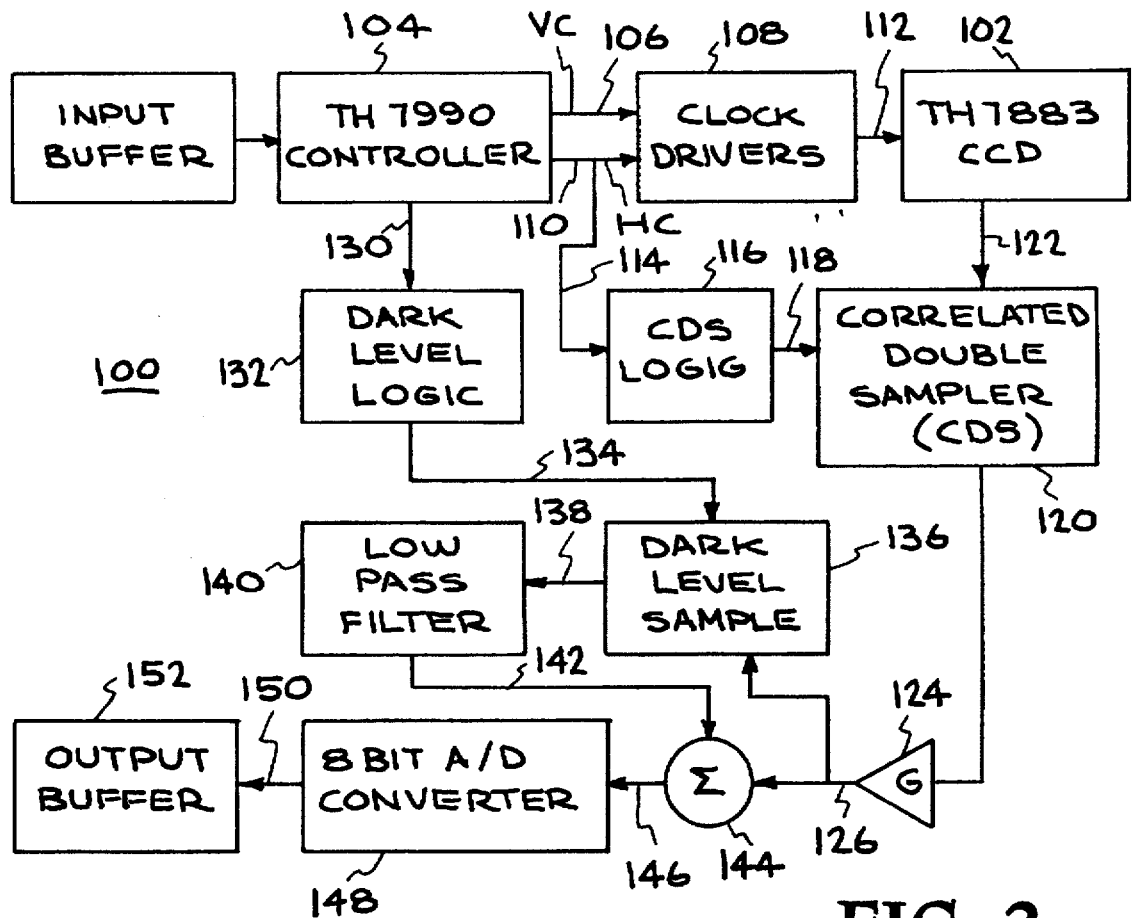
FIG. 2 is a block diagram of a high performance star tracker camera system susceptible to radiation damage.

FIG. 2 is a block diagram of the electronic circuits for a high performance star tracker camera system 100, which is susceptible to radiation damage. Excluding a DC-DC converter, which is discussed herein below, the star tracker camera system 100 uses commercially available, non-radiation-hardened components. The star tracker camera system uses a photo detector, such as a Thomson TH7883 charge coupled device (CCD) 102. The light sensitivity of the TH7883 CCD and its low noise makes it suitable for star tracker applications. The TH7883 CCD 102 uses NMOS technology to provide a single field area image sensor consisting of 576 by 384 pixels where the size of each pixel is 23 micrometers by 23 micrometers.

A Thomson TH7990 drive clock Sequencer and synchronization integrated circuit, or controller, 104 provides all of the synchronization and drive signals required to operate the TH7883 CCD 102. A vertical clock signal VC is provided from the controller 104 on a signal line 106 to a clock driver circuit 108. A horizontal clock signal HC is provided from the controller 104 on a signal line 110 to the clock driver circuit 108. The clock driver circuit 108 provides appropriate control signals to the CCD 102 on a signal line 112. The horizontal clock signals on signal line 110 are also provided on a signal line 114 to the input terminal of a correlated double sampler (CDS) logic circuit 116 which provides logic control signals on a signal line 118 to a correlated double sampler (CDS) circuit 120. The output signals of the CCD 102 are provided on a signal line 122 to the CDS circuit 120. The output signals of the CDS circuit 120 are then passed through a gain circuit 124 having a gain G and provided on a signal line 126.

The controller 104 provides a clock signal on a line 130 to a dark level logic circuit 132 which provides a signal on a signal line 134 to a dark level sample circuit 136. The dark level sample circuit 136 samples the signal level on signal line 126 for a dark cell of the CCD 102. The dark cells are used to establish a noise floor and provide noise compensation. The sampled output from the dark level sample circuit 136 is fed through a signal line 138 to a low pass filter 140. The output signal of the low pass filter 140 is fed on a signal line 142 to one input terminal of a summer circuit 144. Another input terminal of the summer 144 receives the output signal from the gain circuit 124 on signal line 126. The analog output signal from the summer 144 is fed on a signal line 146 to the input terminal of an 8-bit A/D converter 148 which has an output terminal connected with a signal line 150 to the input terminal of an output buffer circuit 152.

Figure 3:
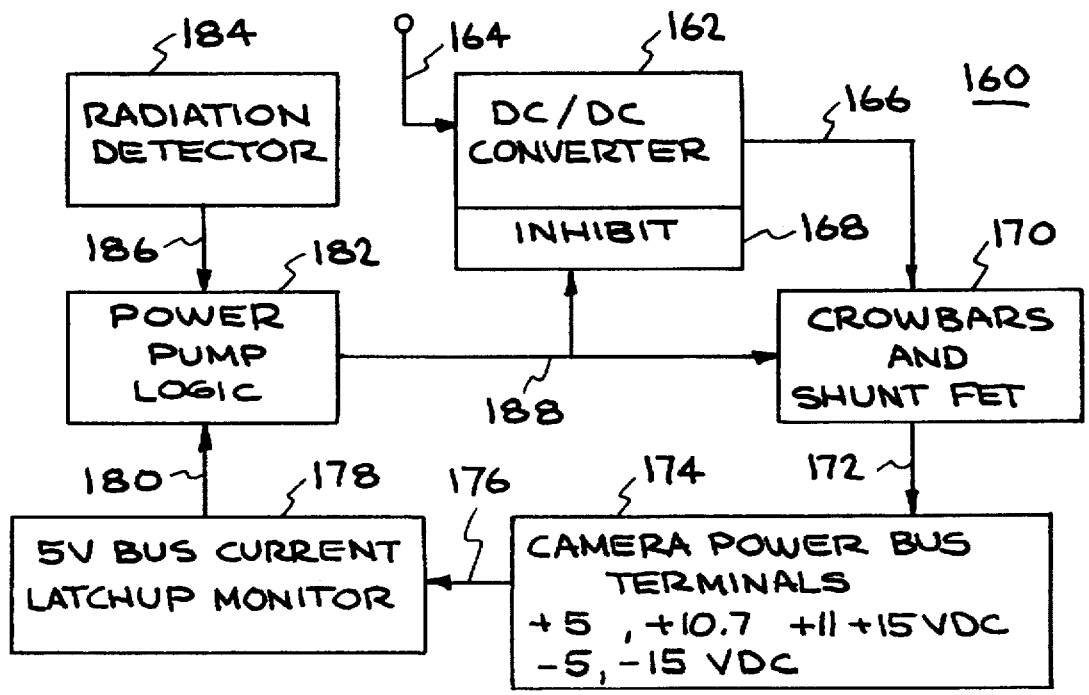
FIG. 3 is a block diagram of a protection system according to the invention.

FIG. 3 is a block diagram of a protection system 160 according to the invention for mitigating the effects of destructive radiation on a microelectronic circuit, such as the star tracker camera system 100. The protection system 160 protects the electronics circuits of the star tracker camera system 100 from potential damage due to prompt photo currents and integrated circuit latchup. The protection system 160 senses and responds to either transient ionizing radiation or a transient current on the +5 V bus caused by a single event latchup.

The protection system 160 includes a DC-to-DC converter circuit 162 which receives power from an external source on a bus 164 and which provides output voltages on buses 166. The buses 166 are connected to a crowbar and shunt FET circuit 170, which includes power MOSFET switches. The output buses 172 of the crowbar and shunt FET circuit 170 are connected to a camera power bus terminal circuit 174, at which are provided various voltages.

A signal line 176 connects a 5 volt bus to a current latchup monitor circuit 178 which senses an excess current, or latchup, condition in the 5 volt bus to provide a detection signal on a signal line 180 to one input terminal of a power dump logic circuit 182. An ionizing radiation pulse detector circuit 184 detects a radiation pulse and provides a radiation detection signal on a signal line 186 to another input terminal of the power pump logic circuit 182. The output signal of the power dump logic circuit 182 is provided on a signal line 188 to activate the inhibit circuit 168 of the DC/DC converter 162 and the crowbar and shunt FET circuit 170.

Figure 4:
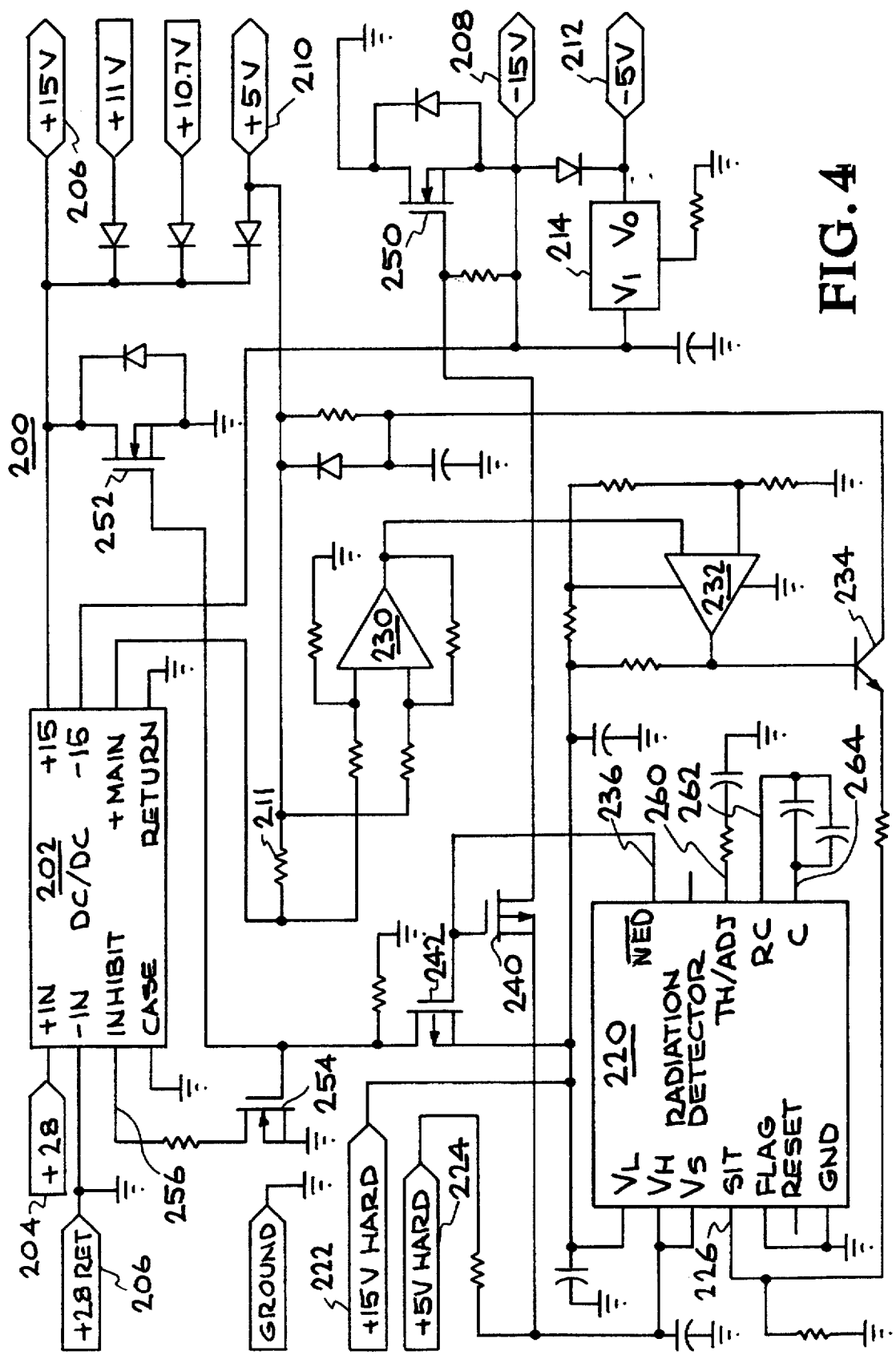
FIG. 4 is a circuit diagram of a power dump circuit according to the invention.

FIG. 4 is a diagram of a circuit 200 for the protection system 160 according to the invention for mitigating the effects of destructive radiation on, for example, the star tracker camera system 100. The circuit 200 protects the electronic circuits of the star tracker camera system 100 from potential damage due to prompt photo currents or to integrated circuit latchup. The circuit 200 senses and responds to either transient ionizing radiation or to a transient current on a +5 V bus caused by a single event latchup in an integrated circuit.

The DC-to-DC converter 202 is a module which is the source of all of the camera operating voltages with the exception of an ionizing radiation pulse detector, which requires external uninterrupted power. The DC-to-DC converter circuit 202 is a small 15 watt radiation-hardened DC-to-DC converter mounted on a circuit board with the other components. The DC-to-DC converter circuit 202 is connected, for example, to a standard spacecraft +28 VDC power source at terminal 204 and to a +28 VDC ground return at terminal 206 for providing voltages required for operation of the star tracker camera. At terminal 208 is provided −15 VDC and at terminal 212 is provided −5 VDC. At terminal 210 is provided +5 VDC through a 0.1 ohm series sense resistor 211. A −5 VDC voltage is provided at output terminal 212 of a voltage regulator circuit 214, which has its input terminal connected to terminal 208. The DC-to-DC converter circuit 202 also isolates the star tracker camera from other electrical noise sources in the spacecraft. This isolation minimizes the effects of electromagnetic interference (EMI) and electromagnetic coupling (EMC). Minimization of the EMI and EMC allows a camera to be used in a wide range of applications.

An ionizing radiation pulse detector circuit 220 is provided by an integrated circuit such as an HSN-3000. Power to the radiation pulse detector circuit 220 is provided from a +15 VDC uninterruptable source connected to terminal 222 and from a +5 VDC uninterruptable source connected to terminal 224. The +15 VDC and +5 VDC hard sources can be derived from the +28 VDC power source and hardened voltage regulators.

The radiation pulse detector circuit 220 provides two functions. One is sense and respond to transient ionizing radiation with an internal radiation detector. The other is to respond to a latchup detection signal provided at a self-test S/T terminal 226 in response to a transient current on the +5 V bus caused by single event latchup in a microelectronic circuit connected to the +5 V bus.

A latchup transient current on the +5 VDC line is detected by sensing the voltage across the series sense resistor 211. The terminals of the sense resistor 211 are connected to respective input terminals of an operational amplifier 230. The operational amplifier 230 amplifies a voltage increase across the sense resistor 211 due to an increased latchup current and provides a sense voltage at its output terminal. The sense voltage is provided to one input terminal of a comparator amplifier 232 which compares the sense voltage to a preset comparator threshold voltage provided at the other input terminal of the comparator amplifier 232. The output terminal of the comparator amplifier 232 is passed through an emitter follower transistor amplifier 234 to the self-test S/T terminal 226 of the radiation pulse detector circuit. If the sense voltage exceeds the comparator threshold voltage, the comparator 232 drives the self test S/T terminal 226 of the ionizing radiation pulse detector 220 HIGH to provide an inverted NED output signal at terminal 236 of the radiation pulse detector circuit 220 to initiate a power dump from the DC-to -DC converter circuit 202 and its output busses, as described herein below. The inverted output signal NED at terminal 236 of the radiation pulse detector circuit 220 is initiated in two ways. One way is to sense and respond to transient ionizing radiation with an internal radiation detector. The other way is to respond to latchup detection signal provided at the self-test S/T terminal 226 in response to a transient current on the +5 V bus caused by single event latchup in a microelectronic circuit connected to the +5 V bus.

The inverted NED at terminal 236 is connected to the gate terminals of MOSFET switches 240 and 242. The switch 240 is activated to apply 5 volts to the gate terminal of a crowbar MOSFET 250, which is turned on to short the -15 VDC terminal 208 to ground. The switch 242 is activated to apply 15 volts to the gate terminal of a crowbar MOSFET 252, which is turned on to short the terminal 206 to ground and all other positive voltages to ground through diodes. The switch 242 is activated to also apply 15 volts to the gate terminal of a MOSFET 254, which is turned on to short the INHIBIT terminal 256 to ground, which disables the +15 VDC and -15 VDC output voltages of the DC-to-DC converter 202. The output voltages of the DC-to-DC converter 202 are disabled and crowbars (labeled CB+ and CB-) shunt each regulated output voltage to ground.

The radiation pulse detector circuit 220 includes a threshold adjustment terminal 260 to which are connected a series resistor and capacitor for setting the threshold for the circuit. The duration of the inverted output signal NED at terminal 236 is controlled by adjustment of the value of a capacitor placed between terminals RC and C of the radiation pulse detector circuit 220. Autonomous recovery occurs upon time out of the radiation pulse detector with subsequent restoration of power and initialization of the camera control logic.

The protection circuit 200 includes the DC-DC converter 202, ionizing radiation pulse detector 220, power MOSFET switches 250, 252, linear integrated circuits 230, 232, MOSFET switches 240, 242 and driver transistor 234.

The radiation harden elements of a system are for survival in a natural space radiation environments with the additional capability for survival of a prompt radiation pulse associated with a nuclear event.

The major design features of the system are: selection of semiconductor devices with an acceptable radiation response; use of a radiation tolerant power supply; and single-event and prompt -pulse latchup mitigation including event detection, power dump, and energy limiting measures with autonomous recovery. A dark line compensation circuit removes radiation induced dark lines caused by radiation striking a CCD dark reference cells, which are used in high performance cameras to establish a noise floor and provide noise compensation.

Figure 5:
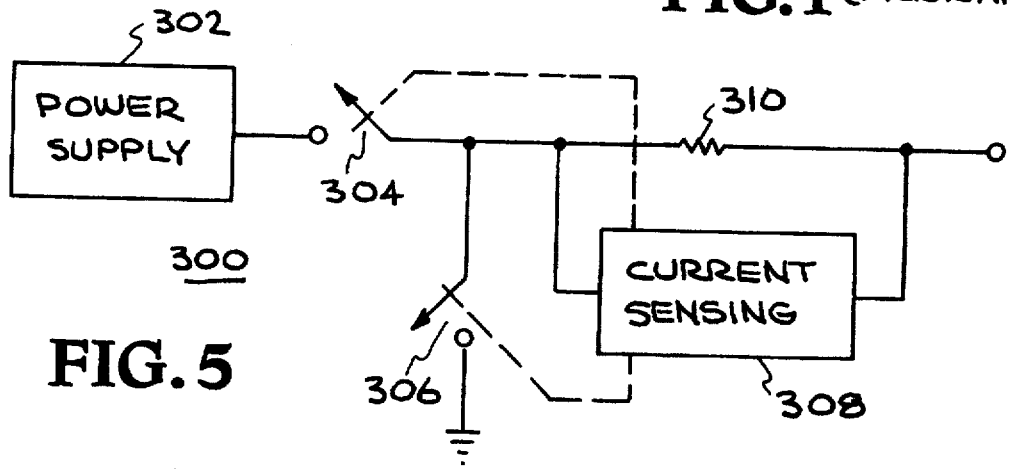
FIG. 5 is a simplified circuit diagram of an alternative power dump circuit according to the invention.

FIG. 5 is simplified circuit diagram of an alternative power dump circuit 300 for a power supply 302. A series output switch 304 is opened and a shunt switch 306 is closed by a current sensing circuit which senses excess current through a series sense resister 310. The alternate design is in contrast to the use of the inhibit feature of the DC-to-DC converter which quickly disconnects the output form the power supply upon the comparator amplifier driving the self-test S/T terminal of the converter HIGH.

Figure 6:
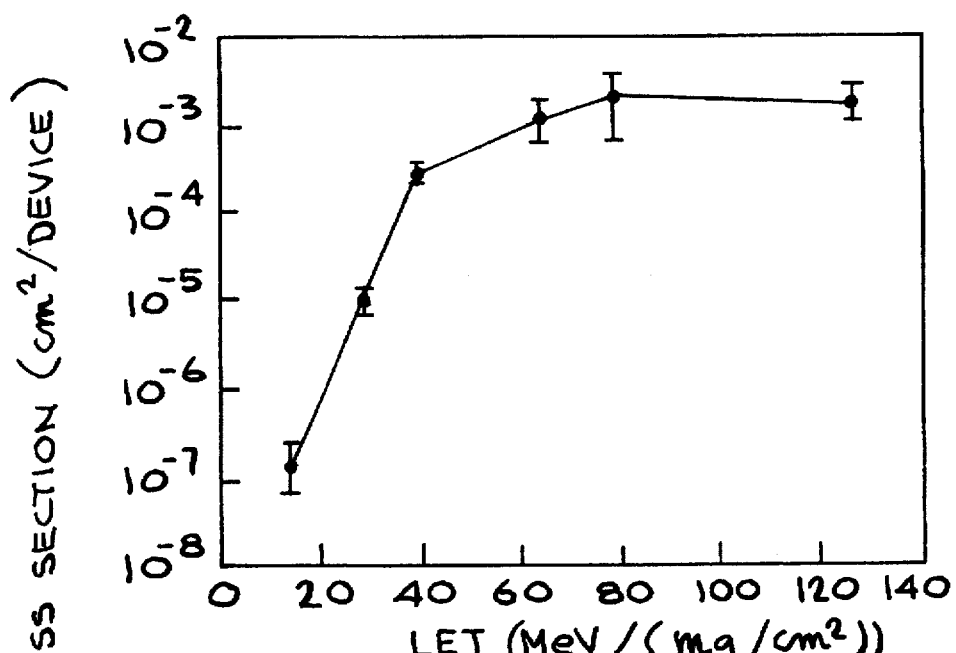
FIG. 6 is a plot of latchup cross section for a controller chip.

FIG. 6 is a plot of latchup cross section for the TH7990 drive clock sequencer and synchronization controller chip 104 as a function of LET. The onset of latchup occurred at a linear energy transfer (LET) of 14.5 (MeV/mg/cm$^2$) and the saturated cross section is $1.70 \times 10^{-3}$ cm$^2$. This plot combined with space environment data allows a user to predict the frequency of ion induced latchup in a TH7990 device.

SETUP FOR SEL TESTS

Single event latchup (SEL) tests and flash x-ray (FXR) dose rate effect tests were performed at system and component levels. SEL tests consisted of latchup induced by heavy ions and strobe lights in delidded controllers. Heavy-ion SEL tests were performed at the 88 inch cyclotron at Lawrence Berkeley Laboratory. An Aerospace Corporation target and diagnostic chamber were used and Aerospace Corporation monitored ion flux and energy. Table 1 shows the types of ions, Linear Energy Transfer (LET), and angle between the beam and the normal to the device surface.

TABLE 1

Characteristics of Ions Used in SEP Tests

| Ion | Energy (MeV) | Rotation (deg) | LET (MeV/ (mg/cm$^2$) |
|---|---|---|---|
| $20_{Ne}$ | 89 | 0 | 5.5 |
| $20_{Ne}$ | 89 | 60 | 11 |
| $40_{Ar}$ | 175 | 0 | 14.5 |
| $40_{Ar}$ | 175 | 48 | 21.7 |
| $65_{Cu}$ | 283 | 0 | 28.8 |
| $86_{Kr}$ | 366 | 0 | 38.8 |
| $86_{Kr}$ | 366 | 60 | 77.6 |
| $136_{Xe}$ | 603 | 0 | 63.3 |
| $136_{Xe}$ | 603 | 60 | 126.6 |

SEL tests of the TH7990 controller consisted of operating delidded ceramic versions of the plastic device and monitoring the +5 VDC voltage for latchup current during ion exposure. Monitoring one phase of the four phase "CCD readout resister clock" and the "composite blanking pulse" output lines verified device operation. Operating the camera while exposing the TH7990 controller to the beam allowed system level latchup mitigation tests. Th7883 SEL tests and system level latchup mitigation tests used the same ions as the TH7990 SEL device tests but only at zero degree rotation.

A strobe pulse of approximately 2 microseconds FWHM from a General Radio Model 1538-A Strobotac caused latchup in a de-lidded TH7990 controller chip. This allowed bench top testing of the latchup mitigation circuit while monitoring the camera bias voltages and TH7990 control signals.

HEAVY ION AND STROBE LIGHT TEST RESULTS

FIG. 6 is a plot of latchup cross section for a delidded TH7990 drive clock sequencer and synchronization controller chip 104 as a function of LET. The onset of latchup occurred at a linear energy transfer (LET) of 14.5 (MeV/mg/cm$^2$) and the saturated cross section is $1.70 \times 10^{-3}$ cm$^2$. During the SEL ion testing of the TH7990 controller the part latched with a 100 to 140 mA increase in current with the onset of latchup occurring at an LET of 14.5 (MeV/mg/cm$^2$) and a saturated cross section of $1.70 \times 10^{-3}$ cm$^2$.

Figure 7A:
FIGS. 7A–7E show plots of various signals for the controller, the power supply voltage, and an excitation signal for the system.
Figure 7B:
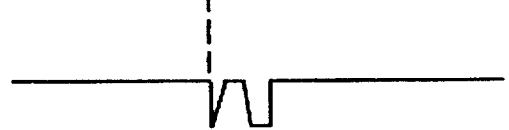
Figure 7C:
Figure 7D:
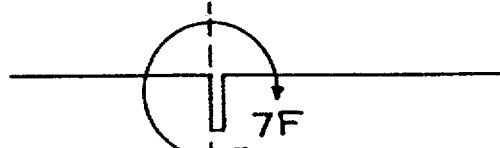
Figure 7E:
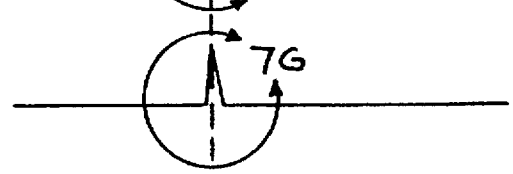

FIGS. 7A–7E show several signal waveforms using a 5 V/Div. scale and a 20 ms./Div. scale. A signal trace labeled FIG. 7E is for an excitation signal, which initiates a power dump. A trace labeled FIG. 7D shows a typical power supply voltage. An arbitrary power dump period of 5 ms removes power from the circuit long enough to quench any latchup, yet short enough to minimize system impact.

Following power-up, the camera comes up in an undefined state and requires a re-initialization to restore the correct operating mode. FIGS. 7A–7C show wave forms for the TH7990 device indicating operational recovery indicative of an automatic mode reset. Signal MDCNTL labeled FIG. 7A and signal INIT labeled FIG. 7B set internal mode control registers for the TH7990 device. At this point a computer can reset the camera logic in response to a fast interrupt. The trace labeled FIG. 7C shows a clock output signal from the TH7990 used to derive a CCD clock signal.

FIG. 7F shows on an expanded scale the signal waveform using a 2 v/Div. scale and a 2 milliseconds/Div. scale for the power supply waveform of FIG. 7D. This shows a dump time of approximately 5 millisecond.

FIGS. 7G and 7H show on an expanded scale the signal waveform using a 2 v/Div. scale and a 2 microseconds/Div. scale for the excitation signal waveform labeled FIG. 7E and the comparator output signal, labeled FIG. 7H showing a delay time of approximately 8 microseconds.

SETUP FOR FXR DOSE RATE TESTS

Two power dump circuits as shown in FIGS. 4 and 5 with simulated loads for the camera electronics were tested at the Physics International 1150 flash x-ray facility. Both circuits shunted the power supply output voltages to ground and disconnected the simulated camera electronics from the power supply. The circuit of FIG. 5 uses discrete series MOSFETs to disconnect the DC to DC converter output voltages from the simulated camera electronics and shunt MOSFETs. The circuit of FIG. 4 is in the star tracker and uses the built-in output disable feature of the DC-to-DC converter. This latter circuit has fewer parts and provides EMI/EMC isolation.

Physics International 1150 facility's 6 inch diameter cathode pulsed 3.8 MeV radiation source gave spatially uniform dose rates up to $1.1 \times 10^{11}$ rad(Si)/s over the area of the power dump circuit. Radiation diagnostics included an array of LiF TLDs (Thermoluminescent Dosimeters), provided and measured by Physics International, and two PIN diodes. TLD measurements provided the total dose and the PIN diodes the full Width Half Max (FWHM) pulse width of 45 ns. The 0.87 in dose rate equation 1 converts the LiF total dose to rad (Si).

$$\text{Rad(Si)}/s = \frac{\text{Total Dose} * 0.87}{FWHM} \quad (1)$$

FXR test data were recorded on HP transient wave form digitizers. All input and output voltages were monitored by resistive voltage probes, and transient current measurements were made on the +28 and +5 power buses with Pearson Model 100 A current probes.

FXR POWER DUMP TEST RESULTS

The flash x-ray FXR tests characterized the DC-DC converter power dump circuit used in the star tracker and the series switch power dump circuit. The following measurements were made: (a) power supply voltages fall time during radiation exposure, (b) recovery time of regulated voltages, and (c) DC-DC converter input current. Recorded pre- and post-shot DC power levels provided a simple diagnostic of abnormal circuit behavior. Triggering the self test power strobe function of the ionizing radiation pulse detector provided baseline power dump data prior to radiation exposures.

Figure 8:
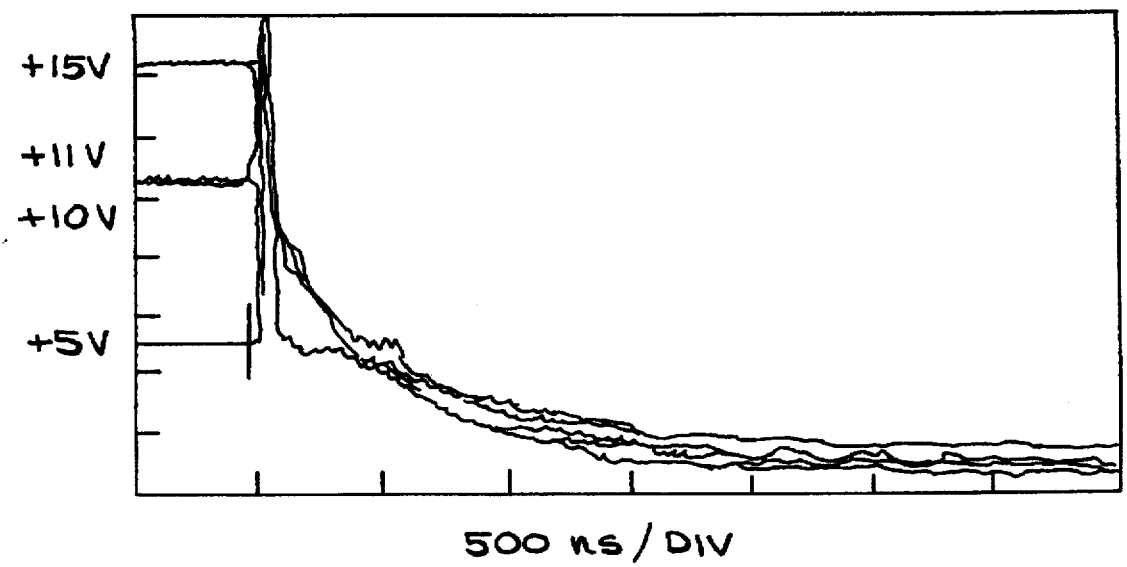
FIG. 8 is a plot of the fall times of the positive output voltages with an expanded time scale after exposure to a dose rate of $7.6 \times 10^{10}$ rad(SI)/sec.

FIG. 8 shows the fall times of the positive camera bias voltages for the DC-DC converter power dump circuit. All the voltages fall to less than one volt within 2 to 3 microseconds, which is sufficient to preclude latchup induced burnout in integrated circuits.

Figure 9:
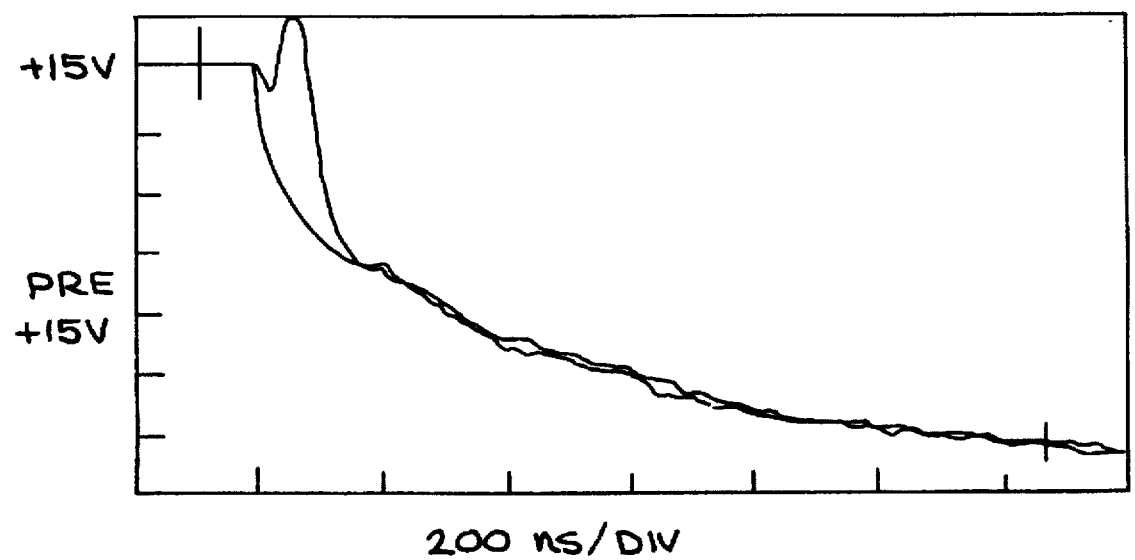
FIG. 9 is a plot comparing the +15 VDC fall times during pre-shot and during exposure to $7.6 \times 10^{10}$ rad(SI)/sec.
Figure 10:
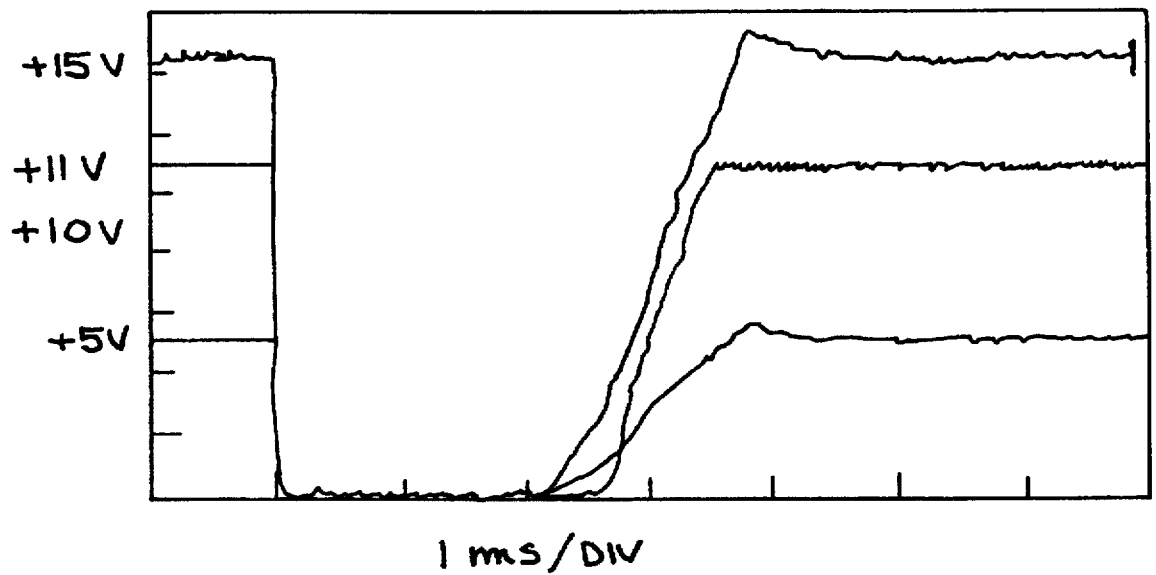
FIG. 10 is a plot of the positive output voltages showing normal operational voltages, power dump, and recovery times.

FIG. 9 shows a comparison between the fall times for the +15 VDC line before and during an exposure of $7.6 \times 10^{10}$ rad(Si/s) and indicates no significant dose rate effects. The transient ringing during the radiation exposure is radiation induced cable current. Since the current injection occurs after the 2K ohm signal pick-off resister and before the 50 ohm resistor in the 2 k to 50 ohm voltage probe the transient voltage must be scaled. After scaling the estimated transient ringing is less than 0.2 volts. FIG. 10 shows the recovery time of the positive voltages of the DC-DC converter power dump circuit following an exposure of $7.6 \times 10^{10}$ rad (Si/s). Recovery occurs within 4 ms of the exposure with 2 ms due to the time out period of the ionizing radiation pulse detector. The remaining recovery time the RC time constant for removing the gate voltage due to gate capacitance and the 10 k ohm resistor between the MOSFET gate and ground. Decreasing the 10 k ohm gate resistor allows faster recovery times. The half volt overshoots on the ±15 VDC and +5 VDC lines is coincident with the one Amp surge on the 28 VDC input to the DC-DC converter. The current surge recharges and stabilizes the DC-DC converter output capacitance and the simulated load capacitance.

Figure 11:
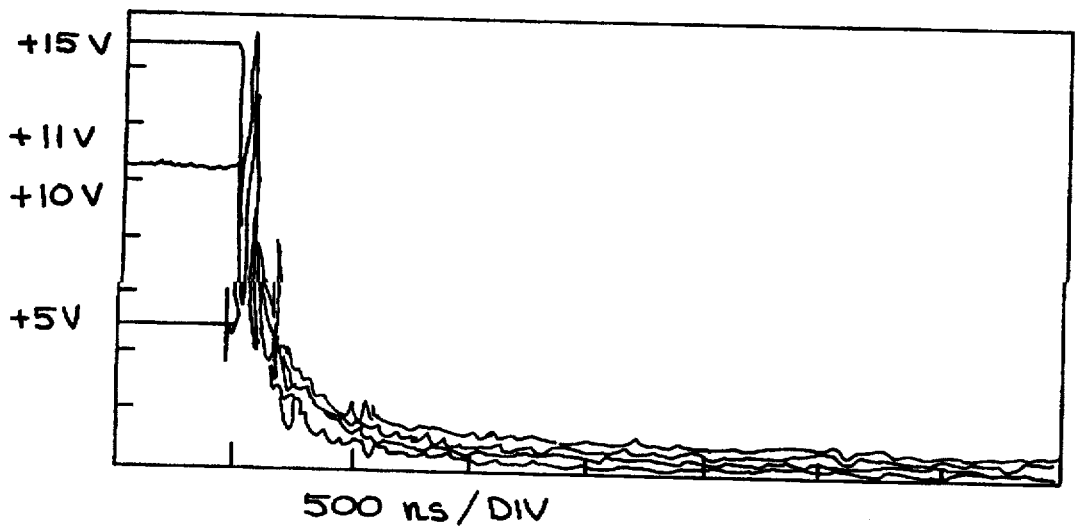
FIG. 11 is a plot of the fall times for the positive output voltages during a power dump for a system which uses series and shunt MOSFETs at a dose rate of $9.9 \times 10^{10}$ rad(SI)/sec.

The second power dump circuit of FIG. 5 uses series MOSFETs (IRFD9024) to disconnect the power supply voltages from shunt MOSFETs and simulated camera electrical loads. Removing the DC to DC converter output capacitance from the shunt MOSFETs results in twice as fast fall times as shown in FIG. 11. The fast power dump circuit of series and shunt MOSFETs is a general purpose circuit that can be used to isolate power supplies or capacitance from the sensitive electronics and dump power before damage occurs.

The "blink" approach according to the invention was developed and incorporated into a prototype star tracker for handling single event and transient radiation latchup. Laboratory and radiation effect tests confirm autonomous system level latchup detection and mitigation before permanent semiconductor burnout occurs. Heavy ion SEL and FXR dose rate radiation tests have demonstrated that fast acting, low on resistance MOSFETs can quickly dump power to electronic packages and prevent device burnout. The blink approach allows the use of high performance commercial parts without the cost and performance degradation of systems based on hardened parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the Claims appended hereto and their equivalents.

We claim:

1. A system for mitigating the effects of destructive radiation on a micro-electronic circuit, comprising:
   a power bus switchably connected to a micro-electronic circuit;
   power dump means, having an input terminal and an output terminal, for switchably disconnecting the power bus from the microelectronic circuit;
   ionizing radiation pulse detection means for detecting a pulse of prompt ionizing radiation and for providing at an output terminal thereof a detection signal indicative of the detection of the pulse of prompt ionizing radiation;
   current sensing means coupled to said power bus for determining an occurrence of excess current through said power bus resulting from destructive single-event-phenomena or from prompt ionizing radiation pulses, said current sensing means having an output terminal at which is provided a control signal indicative of the occurrence of excess current through the power bus; and
   logic means having an input terminal connected to the output terminal of the ionizing radiation pulse detection means and also connected to the output terminal of the current sensing means, said logic means providing an output signal to the input terminal of said power dump means, said power dump means switchably disconnecting the power bus from the micro-electronic circuit upon receipt of the output signal from said logic means upon detection of a pulse of prompt ionizing radiation or occurrence of excess current through the power bus.

2. The system of claim 1 wherein the power dump means includes means for opening the power bus.

3. The system of claim 2 wherein the power dump means further includes means for shorting the power bus to a ground potential to remove power from the power bus.

4. The system of claim 3 wherein the means for opening the power bus and means for shorting the power bus to a ground potential includes a series FET and a shunt FET.

5. The system of claim 1 including a DC/DC converter for providing power to the power bus wherein the DC/DC converter includes an inhibit input terminal.

6. The system of claim 1 wherein the current sensing means coupled to said power bus for determining an occurrence of excess current through said power bus includes a resistor in series with the power bus across which is developed a sensing voltage and includes a comparator circuit for comparing the sensing voltage with a reference voltage.

7. The system of claim 1 including autonomous recovery means for restoration of power upon time out of the radiation pulse detector.

8. The system of claim 1 wherein the logic means comprises FET switches.

9. The system of claim 1 wherein:
   said ionizing radiation pulse detection means also includes a test input terminal which when activated also produces a detection signal at the output terminal; and
   said output terminal of said current sensing means is connected to the test input terminal of the ionizing radiation pulse detection means rather than to the input terminal of the logic means, whereby said power dump means switchably disconnects the power bus from the micro-electronic circuit upon receiving said output signal from said logic means, which results from receipt of said detection signal indicative of the detection of the pulse of ionizing radiation, which in turn results from said control signal from said current sensing means that is connected to the test input terminal of the ionizing radiation pulse detection means that indicates an occurrence of excess current through the power bus.

10. A system for mitigating the effects of destructive radiation on a micro-electronic circuit comprising:
    a power bus switchably connected to a micro-electronic circuit;
    power dump means, having an input terminal and an output terminal, for switchably disconnecting the power bus from the microelectronic circuit;
    current sensing means coupled to said power bus for determining an occurrence of excess current through said power bus resulting from destructive single-event-phenomena or from prompt ionizing radiation pulses, said current sensing means having an output terminal at which is provided a control signal indicative of the occurrence of excess current through the power bus; and
    logic means having an input terminal connected to the output terminal of the current sensing means, said logic means providing an output signal to the input terminal of said power dump means, said power dump means switchably disconnecting the power bus from the micro-electronic circuit upon receipt of the output signal from said logic means upon occurrence of excess current through the power bus caused by destructive radiation.

11. The system of claim 10 wherein the logic means comprises FET switches.

12. The system of claim 10 wherein the current sensing means coupled to said power bus for determining an occurrence of excess current through said power bus includes a resistor in series with the power bus across which is developed a sensing voltage and includes a comparator circuit for comparing the sensing voltage with a reference voltage.

13. The system of claim 10 wherein the power dump means includes means for opening the power bus.

14. The system of claim 13 wherein the power dump means further includes means for shorting the power bus to a ground potential to remove power from the power bus.

15. The system of claim 13 wherein the means for opening the power bus and means for shorting the power bus to a ground potential includes a series FET and a shunt FET.

16. A method for mitigating the effects of destructive radiation on a micro-electronic circuit, comprising the steps of:
    providing an output voltage on a power bus for a micro-electronic circuit;

detecting a pulse of ionizing radiation and providing a detection signal indicative of the detection of the pulse of ionizing radiation and providing an indicative thereof;

determining an occurrence of excess current through said power bus and providing an excess-current alarm signal indicative thereof; and disabling the power bus in response to the ionizing-radiation alarm signal or to the excess-current alarm signal.

17. The method of claim 16 wherein the step of disabling the power bus includes opening the power bus and shorting the power bus to a ground potential to quickly remove power from the power bus in response to an ionizing-radiation alarm signal or to an excess-current alarm signal.

18. The method of claim 17 wherein the step of opening the power bus and shorting the power bus to a ground potential includes activating a series FET and a shunt FET.

19. The method of claim 18 wherein the step of determining an occurrence of excess current through said power bus includes sensing a voltage across a resistor in series with the power bus and comparing the sensing voltage with a reference voltage.

20. The method of claim 16 wherein the step of providing an output voltage on a power bus includes providing a DC/DC converter for providing power to the power bus.

* * * * *